United States Patent [19]

Bricker et al.

[11] 3,730,303
[45] May 1, 1973

[54] PARKING BRAKE, SPRING APPLIED, HYDRAULIC RELEASED

[75] Inventors: Carl E. Bricker, Cuyahoga Falls; Kenneth P. Hillegass, Akron, both of Ohio

[73] Assignee: The Goodyear Tire & Rubber Company, Akron, Ohio

[22] Filed: Jan. 4, 1971

[21] Appl. No.: 103,732

[52] U.S. Cl. ................................. 188/170, 188/72.3
[51] Int. Cl. .......................................... F16d 65/24
[58] Field of Search ................. 188/170, 72.3, 71.7

[56] References Cited

UNITED STATES PATENTS

| | | | |
|---|---|---|---|
| 3,155,199 | 11/1964 | Bricker | 188/170 |
| 3,417,843 | 12/1968 | Trollope | 188/72.3 X |
| 3,547,233 | 12/1970 | Girvan | 188/170 |
| 2,959,253 | 11/1960 | Goode | 188/71.7 X |
| 3,348,636 | 10/1967 | Boyles | 188/72.3 |
| 3,500,970 | 3/1970 | Schilling | 188/170 |

*Primary Examiner*—Evon C. Blunk
*Assistant Examiner*—Merie F. Maffei
*Attorney*—Oldham & Oldham

[57] ABSTRACT

An emergency or parking brake for a motorized wheel vehicle. Friction pads are carried in aligned relationship on opposite sides of a rotating disc. The pads are mounted on plates and a pair of U-shaped springs engage the edges of the plates to force the plates and pads into clamping relation with the disc. The mounting plates are also connected to pistons. When hydraulic pressure is present the pistons counter the spring forces and hold the friction pads away from the discs.

9 Claims, 5 Drawing Figures

INVENTORS
CARL E. BRICKER
BY KENNETH P. HILLEGASS

Dedham & Dedham
ATTORNEYS

PARKING BRAKE, SPRING APPLIED, HYDRAULIC RELEASED

The present invention relates to a spring applied brake, and more particularly to a parking or emergency brake for a motorized wheel vehicle which is operative only on the failure or removal of the hydraulic supply.

In U.S. Pat. No. 3,155,199, entitled SPRING APPLIED BRAKE there is shown a fail safe brake unit. This brake unit utilizes a U-shaped spring element to force friction pads into braking engagement with opposite sides of a moving member and a hydraulic piston operating through a toggle linkage to hold apart the spring assembly. The present invention constitutes an improvement over the brake unit of this patent and is particularly adapted for use as a parking brake of a motorized wheel vehicle.

It is the primary object of the present invention to provide a brake which is inoperative as long as hydraulic pressure is present but which immediately applies substantial braking force to a moving member when hydraulic pressure is removed, either controllably or as a result of a failure in the system.

It is also an object of the invention to provide a brake unit which is of simple mechanical construction and which is capable of applying high braking pressure.

A further object of the invention is the provision of a vehicle parking or emergency brake in which spring elements are employed to achieve the braking pressure in a fail safe operational manner.

For a more complete understanding of the invention and the objects and advantages thereof reference should be had to the following detailed description and the accompanying drawing wherein the preferred embodiment of the invention is illustrated.

Figure 1:
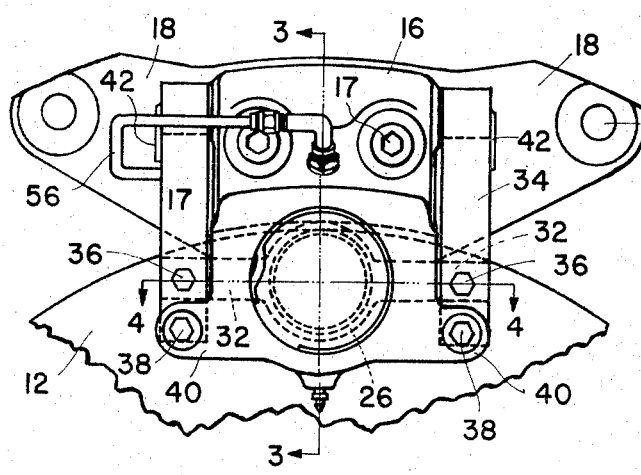
FIG. 1 is a side elevational view of the brake unit of the present invention.

The reference numeral 10 designates generally the brake unit assembly while the numeral 12 designates a rotating disc which is mounted on a suitable axle or shaft, not shown herein. The brake unit 10 is adapted to force friction pads against opposite faces of the disc 12 to achieve braking action. It is contemplated that the brake unit 10 may be employed as a parking and emergency brake for a motorized wheel vehicle, that is, a vehicle in which the wheel is directly driven by a motor. However, the unit 10 may also be used in other situations where it is desirable to provide a fail safe brake unit for controlling a rotating member, or any moving member.

The brake unit 10 includes a pair of housings 14 and 16 which are held together by bolts 17. The housing 14 has mounting lugs 18 with bolt holes 20 for mounting the brake unit 10 to a fixed structure such as the axle housing or some portion of the vehicle frame. A slot or recess 22 is provided between the two housings 14 and 16 to receive the rotating disc 12. Each of the housings 14 and 16 has a bore or recess 24 extending inwardly from the slot 22. Slidably received within each bore 24 is a brake pad mounting plate 26. Friction pads 28 are mounted on the plates 26, the pads 28 being mounted on the faces of the plates 26 which are adjacent the flat sides 30 of the rotating disc 12.

Figure 2:
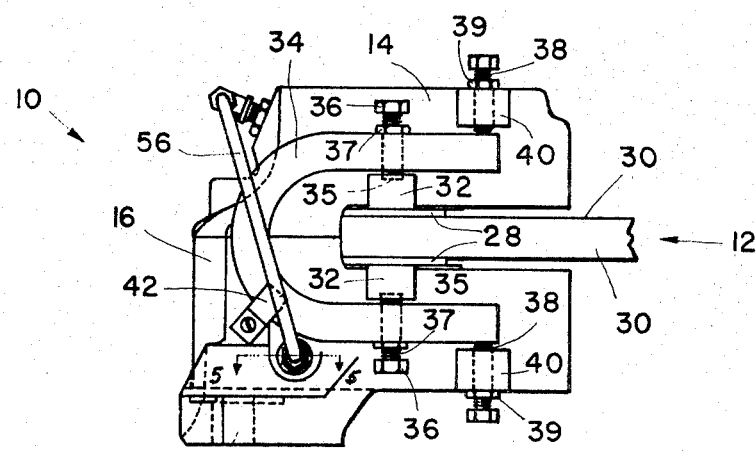
FIG. 2 is an end elevational view of the brake unit of FIG. 1.
Figure 5:
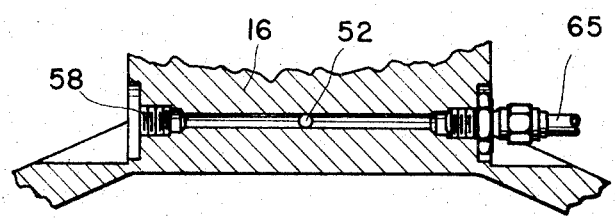
FIG. 5 is a fragmentary sectional view taken along the line 5—5 of FIG. 2.
Figure 3:
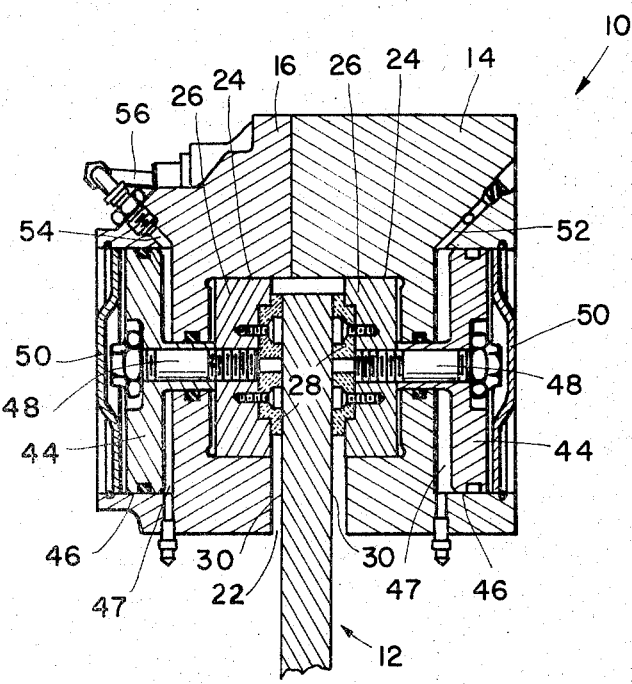
FIG. 3 is a vertical sectional view taken along the line 3—3 of FIG. 1.
Figure 4:
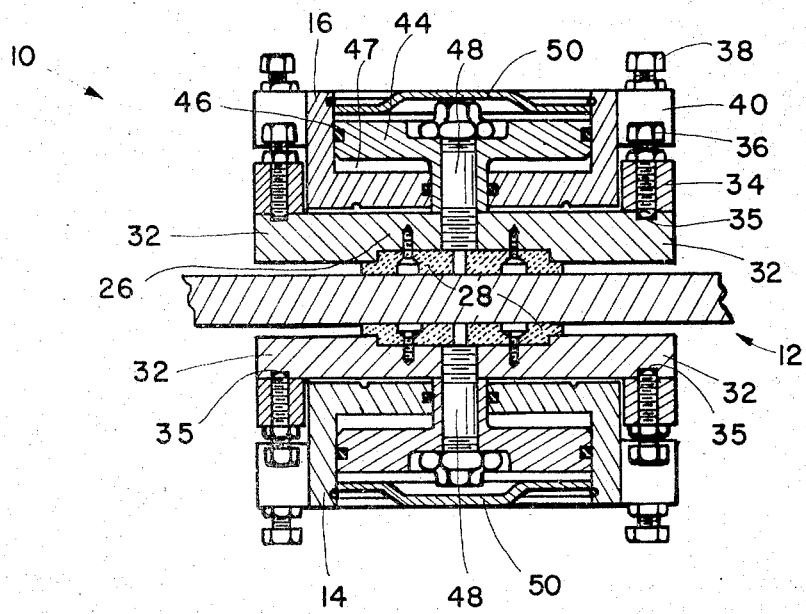
FIG. 4 is a fragmentary transverse sectional view taken along the line 4—4 of FIG. 1.

As will be seen most clearly from FIGS. 1 and 4, each of the plates 26 has ears 32 which project beyond the corresponding housing from diametrically opposite sides of the center portion of the plates 26. It will be noted that the ears of the plate 26 associated with the housing 14 are aligned with the ears of the plate associated with the housing 16. The mounting plates 26 and the friction pads 28 are normally forced toward the disc 12 by U-shaped springs 34. As will be seen from FIG. 2, one U-shaped spring 34 is provided at each end of the housing assembly 14, 16. The springs 34 will normally have sufficient resilience in their operative position so that sufficient clamping force can be applied to the pads 28 to achieve a desired torque braking action on the disc 12. Naturally, this can be predetermined and is dependent on the type of metal used, the thickness thereof, its modulus of elasticity, etc. Suffice it to say that a sufficient force is applied by legs of the springs in their released condition to hold the disc 12 from moving under its normally contemplated loading conditions.

Each leg of the spring 34 is threaded to receive a bolt 36 with the end of the bolt extending through the spring leg into a recess 35 in the ear 32 of the mounting plate 26. The bolts 36 are provided with lock nuts 37 so that the positions of the pads 28 can be adjusted manually to compensate for lining wear. The springs 34 are not rigidly mounted to the housings 14 and 16 so that equal force is applied to both sides of the disc 12. A clip 42 attached to the housing 16 is provided for each of the springs 34 to prevent the springs from falling outwardly.

In order to normally hold the brake unit in a released position with the pads 28 retracted from the parallel faces 30 of the disc 12, there is provided in each of the housings 14 and 16 a piston 44 received in a bore 46 in the respective housing and rigidly connected to the mounting plate 26 by a bolt 48. Each bore 46 extends inwardly from the outer end of its respective housing 14 or 16 and is covered by a suitable dust cover 50. The annular region 47 between the inner face of the piston 44 and the bottom of the bore 46 is connected through the ports 52 and 54 and the conduit 56 to an inlet 58 which, in turn, is connected to a hydraulic pressure source. The ports 52 and 54 associated with the bores 46 in the housings 14 and 16, respectively, are interconnected by the conduit 56 so that uniform pressure is applied to both pistons. As long as sufficient hydraulic pressure is available in the annular regions 47 to force the pistons 44 outwardly against the inwardly directed forces supplied by the U-shaped springs 34, the brake is held in its released position. Loss of hydraulic pressure in the annular regions 47, whether due to a failure of the hydraulic system, such as a ruptured line, or to controlled action as by turning off the pressure actuating source, permits the springs 34 to move the mounting plates 26 toward the disc 12.

In order to limit the outward spread of the legs of the U-shaped springs 34 and to prevent overstressing on the springs when the mounting plates 26 and the legs of the springs 34 are forced apart by the pistons 44, stops are provided for engaging the ends of the legs of the springs 34. These stops, shown in FIG. 2, consist of bolts 38 threaded through lugs 40 projecting from the ends of the housings 14 and 16. Lock nuts 39 are provided on the bolts 38 to permit the adjustment of the total outward movement of the legs of the springs 34. By adjustment of the bolts 38, the clearance between the disc 12 and the brake pads 28 when the brake is inoperative is controlled. This adjustment once initially made upon installation need never be adjusted. The adjustment must be such that the elastic limits of the springs 34 are not exceeded.

As was discussed above, under normal operating conditions hydraulic fluid under pressure will be present in the annular regions 47 to force the pistons 44 outwardly holding the mounting plates 26 and the friction pads 28 retracted from the disc 12 so that the disc is free to rotate. When the hydraulic pressure is removed from the annular regions 47 the springs 38 force the mounting plates 26 inwardly toward the opposed faces 30 of the disc 12, bringing the friction pads 28 into tight clamping engagement with the faces 30. The amount of movement of the mounting plates 26 and the friction pads 28 is controlled by the bolts 36, these bolts being provided with lock nuts 37 to permit adjustment to compensate for lining wear on the friction elements. Adjustment will be necessary periodically as lining wear occurs.

It will be understood that while the brake unit of the present invention has been described as a parking brake for a motorized wheel vehicle, the brake unit is also suitable for other applications where it is desired to provide a fail safe brake for controlling a rotating member. Further, while only the best known embodiment of the invention has been illustrated and described in detail, the invention is not so limited and changes and additions may be made thereto. Reference should thus be had to the appended claims in determining the true scope of the invention.

What is claimed is:

1. A brake unit for a rotatable disc, comprising:
   a pair of friction elements, the elements being located in aligned relationship to one another and on opposite sides of the disc;
   a flat mounting plate for each of the friction elements, each mounting plate having ear portions projecting from opposite sides of the plate;
   a housing having the legs thereof extending on each side of the disc and, slideably receiving each mounting plate between the legs and the disc with sufficient clearance to provide for axial movement relative to the housing and the disc, the ears of each mounting plate extending externally of the housing;
   a pair of separate floating U-shaped springs located externally of and on opposite sides of the housing, one ear portion of each plate being received between the legs of each spring, the arrangement being such that the springs urge the plates together with balanced pressure so that the friction elements engage opposite faces of the disc to exert braking force thereon; and
   a pair of hydraulic piston means carried by the housing, one piston means being connected to each plate and operative to move the respective plate away from the disc.

2. The brake unit according to claim 1 wherein the housing is provided with adjustable stops engaging the legs of the U-shaped springs to limit the movement of the legs away from one another.

3. The brake unit according to claim 1 wherein the U-shaped springs are connected to the ear portions of the mounting plates by means of bolts threaded through the legs of the springs and received in recesses in the ear portions of the plates, one bolt being provided for each ear portion.

4. The brake unit according to claim 3 wherein the bolts are provided with lock nuts so that the position of the brake elements relative to the faces of the disc may be adjusted.

5. The brake assembly according to claim 4 wherein each plate-like member has a generally circular center portion on which the brake pad is mounted and which is received in a first bore in the corresponding housing portion.

6. The brake assembly according to claim 5 wherein the piston within each housing is received within a second bore axially aligned with the first bore.

7. The brake assembly according to claim 4 wherein each U-shaped spring is connected to the corresponding ears of the plate-like members by bolts threaded through the legs of the spring and received in recesses in the ears, one bolt being provided for each ear.

8. The brake assembly according to claim 1 wherein there is provided a clip secured to each end of the housing to allow floating but prevent movement of the respective spring away from the housing.

9. The brake assembly according to claim 1 wherein conduit means are provided for interconnecting the bores of the pistons.

* * * * *